US008823805B2

(12) United States Patent
Takahashi

(10) Patent No.: US 8,823,805 B2
(45) Date of Patent: Sep. 2, 2014

(54) IMAGING APPARATUS, CONTROL METHOD THEREOF, AND STORAGE MEDIUM

(75) Inventor: Ryo Takahashi, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 406 days.

(21) Appl. No.: 13/358,315

(22) Filed: Jan. 25, 2012

(65) Prior Publication Data

US 2012/0200715 A1    Aug. 9, 2012

(30) Foreign Application Priority Data

Feb. 4, 2011    (JP) ................. 2011-022859

(51) Int. Cl.
*H04N 5/225* (2006.01)
*H04N 1/32* (2006.01)
*H04N 5/232* (2006.01)
*H04N 1/00* (2006.01)
*H04N 101/00* (2006.01)

(52) U.S. Cl.
CPC ....... *H04N 5/23245* (2013.01); *H04N 1/32101* (2013.01); *H04N 5/232* (2013.01); *H04N 5/23241* (2013.01); *H04N 1/00323* (2013.01); *H04N 2201/3253* (2013.01); *H04N 2201/3202* (2013.01); *H04N 2101/00* (2013.01); *H04N 2201/3274* (2013.01)
USPC ........................................ 348/169

(58) Field of Classification Search
CPC .............. H04N 5/232; H04N 5/23245; H04N 1/00323; H04N 2101/00; H04N 2201/3202
USPC ......................................... 348/169
See application file for complete search history.

(56) References Cited

U.S. PATENT DOCUMENTS

| | | | | |
|---|---|---|---|---|
| 6,636,158 | B1 * | 10/2003 | Bando et al. | 340/8.1 |
| 6,710,740 | B2 * | 3/2004 | Needham | 342/357.46 |
| 6,721,681 | B1 * | 4/2004 | Christian et al. | 702/178 |
| 7,742,099 | B2 * | 6/2010 | Ueno et al. | 348/372 |
| 7,756,614 | B2 * | 7/2010 | Jouppi | 701/25 |
| 8,185,134 | B2 * | 5/2012 | Gum et al. | 455/456.3 |

* cited by examiner

*Primary Examiner* — Chikaodili E Anyikire
*Assistant Examiner* — Leron Beck
(74) *Attorney, Agent, or Firm* — Canon USA, Inc., IP Division

(57) ABSTRACT

An imaging apparatus includes an imaging unit configured to acquire image data, a positioning unit configured to perform positioning processing for acquiring positional information, a first control unit configured to control the positioning unit to perform the positioning processing at a first time interval, and to control an association unit to associate the positional information with the image data, and a second control unit configured to control the positioning unit to perform the positioning processing at a second time interval, and to control a generation unit to generate the log data based on the positional information, wherein the second control unit changes a time interval based on the acquisition status of the positional information.

7 Claims, 8 Drawing Sheets

IMAGING APPARATUS, CONTROL METHOD THEREOF, AND STORAGE MEDIUM

BACKGROUND OF THE INVENTION

1. Field of the Invention

The present invention relates to an imaging apparatus, a control method of the imaging apparatus, and a storage medium.

2. Description of the Related Art

Recently, a camera including a positioning device such as a global positioning system (GPS) is known. More specifically, a camera including a positioning device having a logger function in which positional information is recorded as log data and, subsequently, a route of movement of a user can be generated by using a personal computer (PC) and the like is known. In the above-described camera, positioning (position calculation) is performed at a fixed time interval (i.e., at a positioning interval). However, such continuously repeated positioning keeps on consuming electric power. The electric power is also required for a shooting operation as one of the important rolls of the camera, so that demanded is to reduce the power consumption used in positioning as much as possible.

To solve the above problem, according to an example of the conventional technique, the positioning interval is changed according to a receiving state of signals from GPS satellites. More specifically, in a case where it becomes a state where the signals cannot be received or in a case where it becomes a state where less signals can be received, the positioning interval is set to be longer in comparison with the state where the signals can be received.

SUMMARY OF THE INVENTION

According to an aspect of the present invention, an imaging apparatus includes an imaging unit configured to capture an image of an object to acquire image data thereof, a positioning unit configured to perform positioning processing for acquiring positional information indicating a position of the imaging apparatus, an association unit configured to associate the positional information acquired by the positioning unit with the image data acquired by the imaging unit, a log data generation unit configured to generate log data based on the positional information acquired by the positioning unit, a first control unit configured to control the positioning unit to perform the positioning processing at a first time interval, and to control the association unit to associate the positional information acquired by the positioning processing performed at the first time interval with the image data, and a second control unit configured to control the positioning unit to perform the positioning processing at a second time interval, and to control the log data generation unit to generate the log data based on the positional information acquired by the positioning processing performed at the second time interval, wherein the first control unit controls the positioning unit to perform the positioning processing at the first time interval irrespective of an acquisition status of the positional information, and wherein, if it is determined that the acquisition status of the positional information does not satisfy a predetermined condition, the second control unit changes a time interval at which the positioning processing is performed to a third time interval that is longer than the second time interval.

According to exemplary embodiments of the present invention, a positioning interval can be suitably controlled according to an operating state of a camera.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

DESCRIPTION OF THE EMBODIMENTS

Various exemplary embodiments, features, and aspects of the invention will be described in detail below with reference to the drawings.

In exemplary embodiments of the present invention, an imaging apparatus including a positioning device is described as an example to which the present invention is applied.

Figure 1:
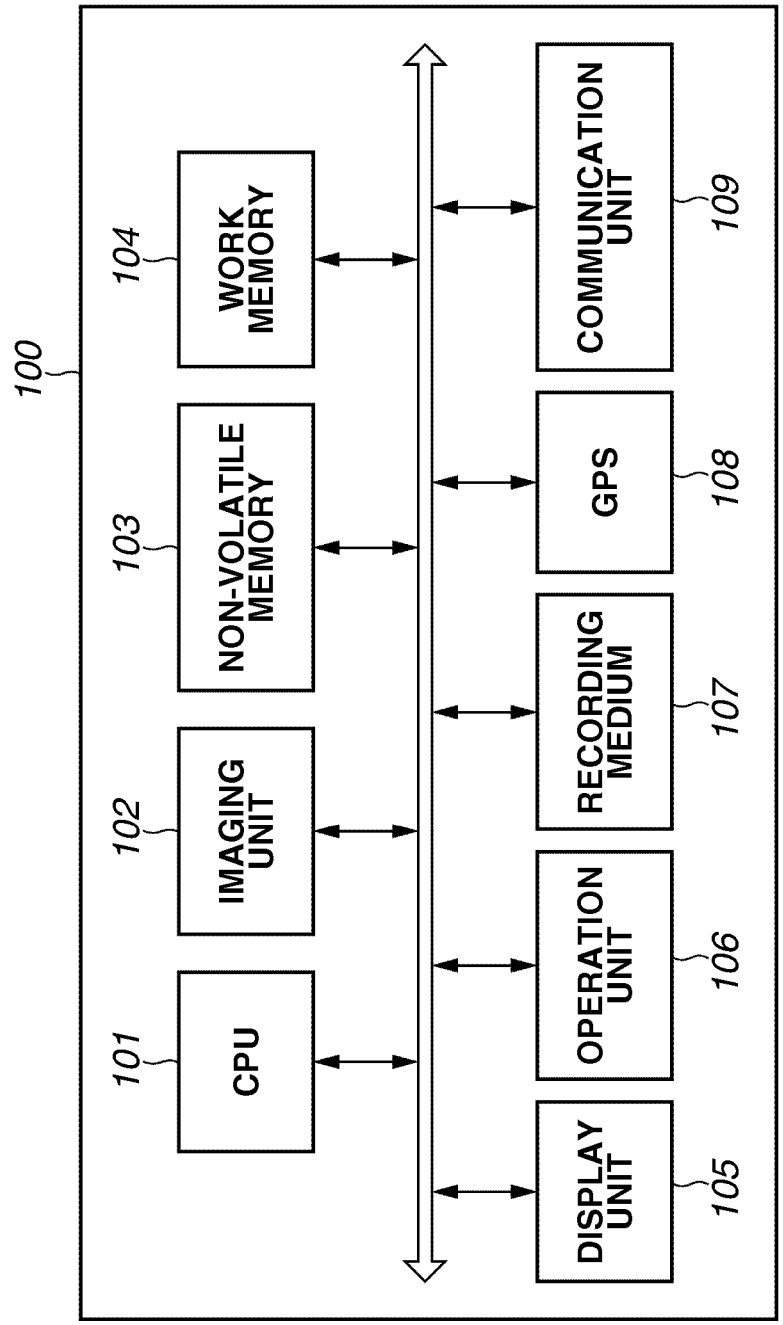
FIG. 1 is a block diagram of a digital camera according to a first exemplary embodiment and a second exemplary embodiment of the present invention.

A digital camera including a GPS is described below as an example of the imaging apparatus including a positioning device. FIG. 1 illustrates a configuration of a digital camera 100 according to a first exemplary embodiment of the present invention.

In the digital camera 100, a central processing unit (CPU) 101 controls each unit of the digital camera 100 according to input signals and the below described programs. The digital camera 100 according to the present exemplary embodiment has five operation modes, i.e., a shooting mode, a playback mode, a logging mode, a communication mode, and a power-off. The CPU 101 controls an operation of the digital camera 100 in each mode. A description of each mode is made below. The apparatus may be controlled entirely such that a plurality of pieces of hardware shares processing of the CPU 101 instead of the control of the whole apparatus by the CPU 101.

An imaging unit 102 is mainly used in capturing an image. The digital camera 100 converts an object optical image that is formed by a lens included in the imaging unit 102 into an electric signal, while performing noise reduction processing and the like on the electric signal, to output digital data in the form of image data.

A non-volatile memory 103 stores programs (i.e., firmware) and various types of setting information to control each unit of the digital camera 100. The non-volatile memory 103 also stores a program with which the CPU 101 controls processing illustrated in each flow chart described below.

A work memory 104 is provided for loading and executing the program stored in the non-volatile memory 103. The work memory 104 is used as a work area for the CPU 101.

A display unit 105 is used for displaying a viewfinder image when capturing an image, displaying the captured image, and displaying characters for an interactive operation. The display unit 105 is not necessarily provided to the digital camera 100. The digital camera 100 may have at least a display control function that enables connecting the digital camera 100 to the display unit 105 and can control a display of the display unit 105.

An operation unit 106 is used for receiving an instruction from the user. The operation unit 106 includes operation members such as a power button for instructing ON/OFF of a power source of the digital camera, a release switch for performing image capturing processing, a playback button for viewing image data, and a selecting button for selecting items from a menu.

A recording medium 107 records therein image data output from the imaging unit 102, positional information and date and time information acquired by the below described GPS 108. The recording medium 107 may be detachable from the digital camera 100 or may be built-in the digital camera 100. That is, the digital camera 100 may include at least a unit for establishing an access with the recording medium 107.

The GPS 108 is used in performing positioning. In performing the positioning, the GPS 108 receives signals from GPS satellites and acquires positional information and date and time information of the GPS 108 from the received signals. A device for acquiring positional information by using, for example, a base station of a cellular phone and an acceleration sensor may also be used in addition to the GPS 108. That is, the digital camera 100 may include at least a function of acquiring the positional information.

A communication unit 109 is a connection unit for establishing a communication with an external device. The digital camera 100 can transmit image data and the like recorded in the recording medium 107 to the external device and can receive image data from the external device via the communication unit 109. The communication with the external device may be wired communication or wireless communication.

The configuration of the digital camera 100 according to the present exemplary embodiment is described above.

An operation mode of the digital camera 100 according to the present exemplary embodiment is described below.

The operation mode described in the present exemplary embodiment includes five modes. The modes are a shooting mode, a logging mode, a playback mode, a communication mode, and a power-off.

In the shooting mode, the imaging unit 102 acquires image data. In the shooting mode, the GPS 108 performs the positioning at a fixed time interval and the CPU 101 acquires positional information to be added to the image data. The acquired positional information is temporally stored in the work memory 104. In a case where positional information is already stored in the work memory 104, the stored positional information is overwritten with the newly acquired positional information. Accordingly, the latest positional information is always stored in the work memory 104. The positional information is read out when the imaging unit 102 acquires the image data and is added to the image data as metadata of the image data. More specifically, the latest positional information that is stored in the work memory 104 at that time is added to the captured image data. In the above-described processing, timing of acquiring the positional information to be added to the image data differs from timing of acquiring the image to which the positional information is to be added. Therefore, a positional gap occurs between the positional information to be added to the image data and a position at which the image is actually captured. In order to minimize the positional gap, the time interval between each positioning is desired to be set shorter, e.g., about 1 second. This is because, as the time interval between each positioning is shorter, the positional gap between the positional information to be added to the image data and the position at which the image is actually captured comes to be smaller.

In the logging mode, the GPS 108 performs the positioning at a fixed time interval independent from the image capturing timing and executes the logging function of recording log data. In the logging mode, the GPS 108 performs the positioning at the fixed time interval and the CPU 101 acquires the positional information and the date and time information. The CPU 101 generates log data by associating the positional information with the date and time information acquired by the GPS 108 to record the log data in the recording medium 107. The positional information and the date and time information acquired at the fixed time interval are added to the generated log data until the day during which the log data is generated ends. When the CPU 101 detects a change of date, new log data is generated. Positional information and date and time information acquired after the change of date is added to the new log data. A plurality of pieces of positional information and date and time information contained in the thus-generated log data represent a moving locus of the digital camera 100. In other words, if a reference is made with respect to the log data, the moving locus of the digital camera 100 while not capturing an image can be grasped. The positional information recorded in the log data is not the information for indicating a position of a moment at which any movement occurs such as the positional information indicating an image capturing position to be added to the image data, but is the information for indicating the moving locus based on a collection of the plurality of pieces of positional information. Therefore, it is not necessary to acquire the positional information at a time interval shorter than that of a case where the positional information is acquired in order to add the positional information to the image data. It is rather useful to acquire the positional information periodically and continuously. In the present exemplary embodiment, the time interval between each positioning in the logging mode is set to a time interval longer than the time interval between each positioning in the shooting mode, e.g., 15, 30, or 45 seconds thereby, acquiring the positional information continuously while suppressing power consumption. The time interval may be set to a time interval identical to that in the shooting mode though the power consumption becomes larger. In the logging mode in the present exemplary embodiment, a power supply to the devices which are not necessary for recording the log data is stopped to cause the digital camera 100 to operate while suppressing the power consumption. Namely, the power supply to, for example, the imaging unit 102 and the display unit 105 is stopped. The user can arbitrarily switch ON/OFF of the logging function via the operation unit 106. A parameter representing the ON/OFF is stored in the non-volatile memory 103.

In the playback mode, image data and moving image data recorded in the recording medium 107 are played back. In the playback mode, the positioning is performed at a time interval identical to that of the shooting mode to acquire the positional information. The acquired positional information is recorded in the work memory 104 in the same manner as it is done in the shooting mode.

In the communication mode, the power supply to the units such as the imaging unit 102 and the display unit 105 is stopped and a communication with the external device is performed via the communication unit 109. In the communication mode, a power supply to the GPS 108 is also stopped. Therefore, the positioning is not performed.

The power-off is a state where the power supply to each unit of the digital camera 100 including the CPU 101 and the GPS 108 is stopped.

Figure 3:
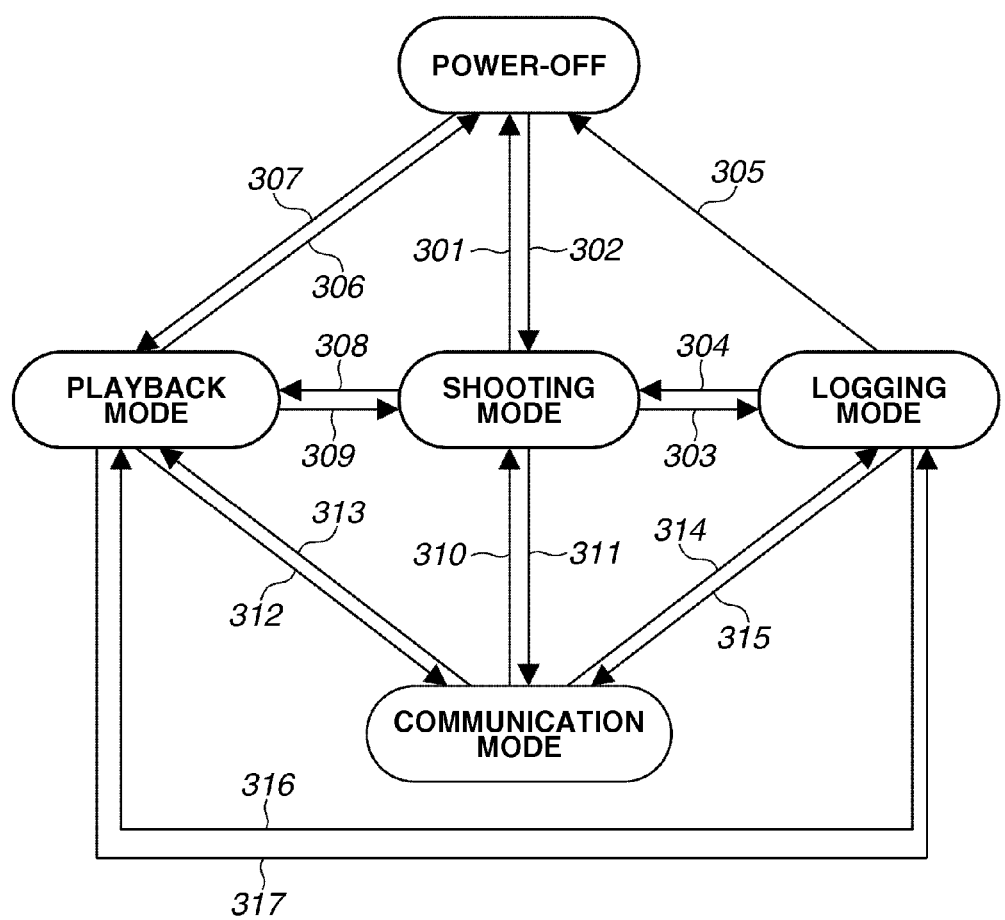
FIG. 3 is a transition diagram illustrating transitional states between modes of the digital camera according to the first and the second exemplary embodiments.

FIG. 3 illustrates a transition between each mode and state.

In the power-off state or the logging mode, in a case where the CPU 101 detects that a power button included in the operation unit 106 is pressed, transitions 302 and 304, respectively, to the shooting mode occur to place the digital camera 100 in the shooting mode.

In the power-off state, the shooting mode, and the logging mode, in a case where the CPU 101 detects that a playback button included in the operation unit 106 is pressed, transitions 307, 308, and 316, respectively, to the playback mode occur to place the digital camera 100 in the playback mode.

In the shooting mode and the playback mode, in a case where the CPU 101 detects that the power button is pressed and that the operation unit 106 does not accept any operation for a certain time period and in a case where the logging function is set to OFF, transitions 301 and 306, respectively, to power-off occur. Accordingly, the digital camera 100 is placed in the power-off state. Also, in a case where the CPU 101 detects that a remaining battery level becomes lower than a predetermined level, transitions 302 and 306, respectively, to the power-off occur to place the digital camera 100 in the power-off state.

In the shooting mode and the playback mode, in a case where the CPU 101 detects that the power button is pressed and the operation unit 106 does not accept any operation for a certain period of time and in a case where the logging function of the digital camera 100 is set to ON, transitions 303 and 317, respectively, to the logging mode occur. Accordingly, the digital camera 100 is placed in the logging mode.

In the playback mode, in a case where the CPU 101 detects that the release switch is pressed, a transition 309 to the shooting mode occurs to place the digital camera 100 in the shooting mode.

In the logging mode, in a case where the CPU 101 detects that the remaining battery level becomes lower than the predetermined level or in a case where the CPU 101 detects that a capacity of the recording medium 107 excesses a predetermined value, a transition 305 to the power-off occurs to place the digital camera 100 in the power-off state. The above-described predetermined value may be preliminary determined or can be set by the user.

In the shooting mode, the playback mode, and the logging mode, in a case where the CPU 101 detects that the digital camera 100 is connected to the external device, transitions 311, 312, and 315, respectively, to the communication mode occur. Accordingly, the digital camera 100 is placed in the communication mode.

In the communication mode, in a case where the CPU 101 detects that the connection with the external device is cut and in a case where a mode before shifting to the communication mode was the playback mode, a transition 313 to the playback mode occurs. Accordingly, the digital camera 100 is placed in the playback mode.

In the communication mode, in a case where the CPU 101 detects that the connection with the external device is cut and in a case where a mode before shifting to the communication mode was the shooting mode, the transition 310 to the shooting mode occurs. Accordingly, the digital camera 100 is placed in the shooting mode.

In the communication mode, in a case where the CPU 101 detects that the connection with the external device is cut and in a case where a mode before shifting to the communication mode was the logging mode, a transition 314 to the logging mode occurs. Accordingly, the digital camera 100 is placed in the logging mode.

The operation mode of the digital camera and the mode transition therebetween according to the present exemplary embodiment are described above.

The positioning operation of the digital camera 100 in the shooting mode is described below.

Figure 4:
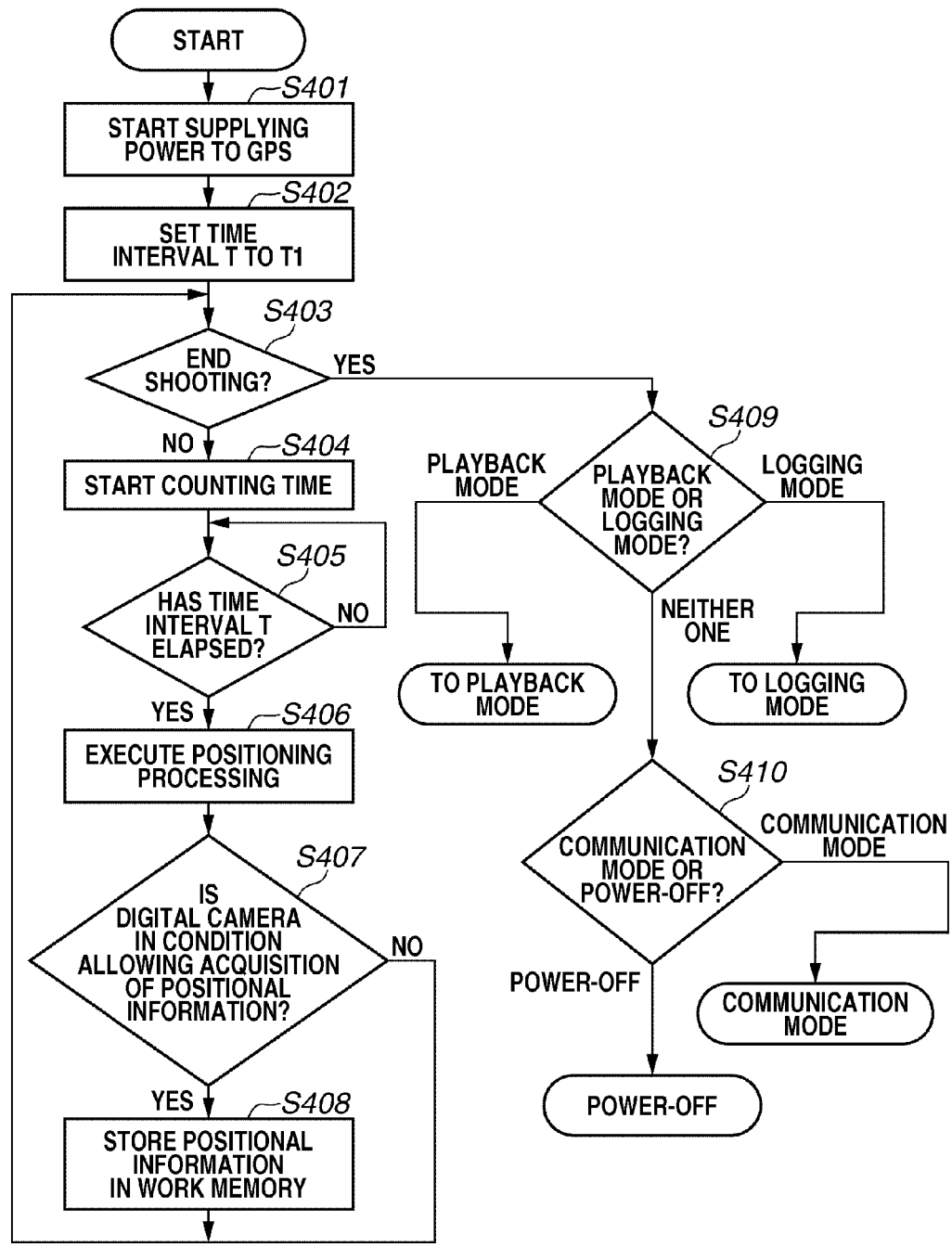
FIG. 4 is a flow chart illustrating an operation of the digital camera in a shooting mode according to the first and the second exemplary embodiments.

FIG. 4 is a flow chart illustrating a positioning operation of the digital camera 100 in the shooting mode. Processing of each step in the flow chart is implemented such that the CPU 101 loads a program stored in the non-volatile memory 103 to control each unit of the digital camera 100 according to the program loaded into the work memory 104. The following processing of each step in the flow chart is implemented in the same manner.

The processing illustrated in the flow chart is started when the operation mode of the digital camera 100 is switched to the shooting mode. Processing other than those of steps S406 and S408 are executed concurrently with image capturing processing.

In step S401, the CPU 101 supplies power to the GPS 108. In a case where the power has already been supplied to the GPS 108, the processing is not performed but proceeds to step S402.

In step S402, the CPU 101 sets a time interval T to T1. The time interval T represents an interval (i.e., positioning interval) between each positioning performed by the GPS 108. The time interval set in this step is stored in the non-volatile memory 103.

In step S403, the CPU 101 determines whether to end the shooting mode. More specifically, the CPU 101 determines to end the shooting mode in a case where the CPU 101 detects any one of the following cases. That is, the CPU 101 detects any one of that the power button is pressed, that the operation unit 106 does not accept any operation for a certain time period, that the remaining battery level becomes lower than the predetermined level, that the digital camera is connected to the external device via the communication unit 109, or that the playback button is pressed. The CPU 101 determines not to end the shooting mode in cases other than the above. In a case where the CPU 101 determines to end the shooting mode (YES in step S403), the processing proceeds to step S409.

In step S409, the CPU 101 determines a transition destination mode based on the detection result in step S403.

In step S409, in a case where the CPU 101 determines to shift to the logging mode, the CPU 101 stops supplying power to the GPS 108, the imaging unit 102, and the like. Accordingly, the digital camera 100 shifts to the logging mode.

In step S409, in a case where the CPU 101 determines to shift to the playback mode, the CPU 101 stops supplying power to the imaging unit 102 and starts supplying power to the display unit 105 and the like. Accordingly, the digital camera 100 shifts to the playback mode.

In step S409, in a case where the CPU 101 determines that the mode of the transition destination is neither one of the logging mode nor the playback mode, the processing proceeds to step S410.

In step S410, the CPU 101 determines to which mode the digital camera 100 shifts based on the detection result in step S403.

In step S410, in a case where the CPU 101 determines to shift to the communication mode, the CPU 101 stops supplying power to the GPS 108, the imaging unit 102, and the like. Accordingly, the digital camera 100 shifts to the communication mode.

In step S410, in a case where the CPU 101 determines to shifts to the power-off state, the CPU 101 stops supplying power to each unit of the digital camera 100. Accordingly, the digital camera 100 is placed in the power-off state.

The processing performed in steps S403, S409, and S410 may be performed in a plurality of processing or may be performed at once.

In step S403, on the other hand, in a case where the CPU 101 determines not to end the shooting mode (NO in step S403), the processing proceeds to step S404.

In step S404, the CPU 101 starts counting time.

In step S405, the CPU 101 determines whether the time interval T has elapsed after the start of counting time. Since the time interval T is set to T1 in step S402, the CPU 101 determines whether the time interval T1 has elapsed after the start of counting time. In a case where the CPU 101 determines that the time interval T has not elapsed yet (NO in step S405), the CPU 101 waits until the time interval T elapses. In a case where the CPU 101 determines that the time interval T has elapsed (YES in step S405), the processing proceeds to step S406.

In step S406, the CPU 101 performs the positioning by the GPS 108. The processing is executed concurrently with processing in the following step S407.

In the following step S407, the CPU 101 determines whether the condition allows the acquisition of the positional information in step S406. More specifically, the CPU 101 determines whether an acquisition status of the positional information satisfies a predetermined condition. The acquisition status means radio field intensity, the number of satellites captured, and the like. The predetermined condition means that the radio field intensity shows a value more than predetermined intensity or the number of satellites captured is more than a predetermined number. In a case where these conditions are satisfied, the CPU 101 determines that the positional information is acquirable. Conversely, in a case where the conditions are not satisfied, the CPU 101 determines that the positional information is not acquirable. In a case where the CPU 101 determines that the positional information is not acquirable (NO in step S407), the processing returns to step S403. In a case where the CPU 101 determines that the positional information is acquirable (YES in step S407), the processing proceeds to step S408.

In step S408, the positional information acquired in step S406 is stored in the work memory 104. Then, the processing returns to step S403.

The positioning operation of the digital camera 100 in the shooting mode is described above.

As described above, in the shooting mode, even in a state where the positional information is not acquirable, the positioning interval is kept constant since the user may suddenly move to a place where the positional information is acquirable and capture an image whereat.

An operation of the image capturing processing of the digital camera 100 in the shooting mode is described below.

Figure 7:
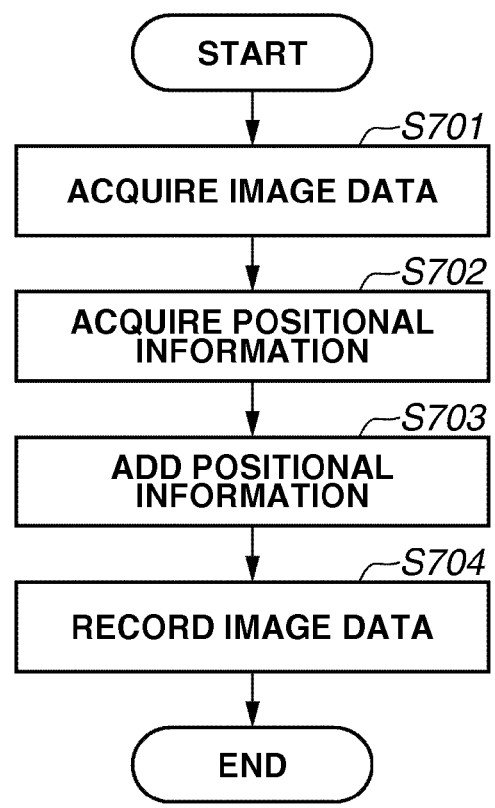
FIG. 7 is a flow chart illustrating an operation of the digital camera in the shooting mode according to the first and the second exemplary embodiments.

FIG. 7 is a flow chart illustrating an operation of image capturing processing by the digital camera 100 in the shooting mode. Processing illustrated in the flow chart is started in response to an instruction to capture an image in a case where the digital camera 100 is in the shooting mode.

In step S701, the CPU 101 acquires image data by the imaging unit 102.

In step S702, the CPU 101 acquires the positional information from the work memory 104. The positional information acquired in step S702 is the positional information stored in the work memory 104 in step S407 of FIG. 4.

In step S703, the CPU 101 associates the positional information acquired in step S702 with the image data acquired in step S701. In the present exemplary embodiment, the image data is treated in the form of the Exif format. In the processing in step S703, the positional information is recorded in a header section of the image data.

In step S704, the CPU 101 records the image data associated with the positional information in step S703 in the recording medium 107.

The operation of the image capturing processing of the digital camera 100 in the shooting mode is described above. In the shooting mode of the present exemplary embodiment, the processing illustrated in FIG. 7 is executed concurrently with the processing other than those in steps S404 and S406 of FIG. 4.

The positioning operation of the digital camera 100 in the playback mode is described below.

Figure 8:
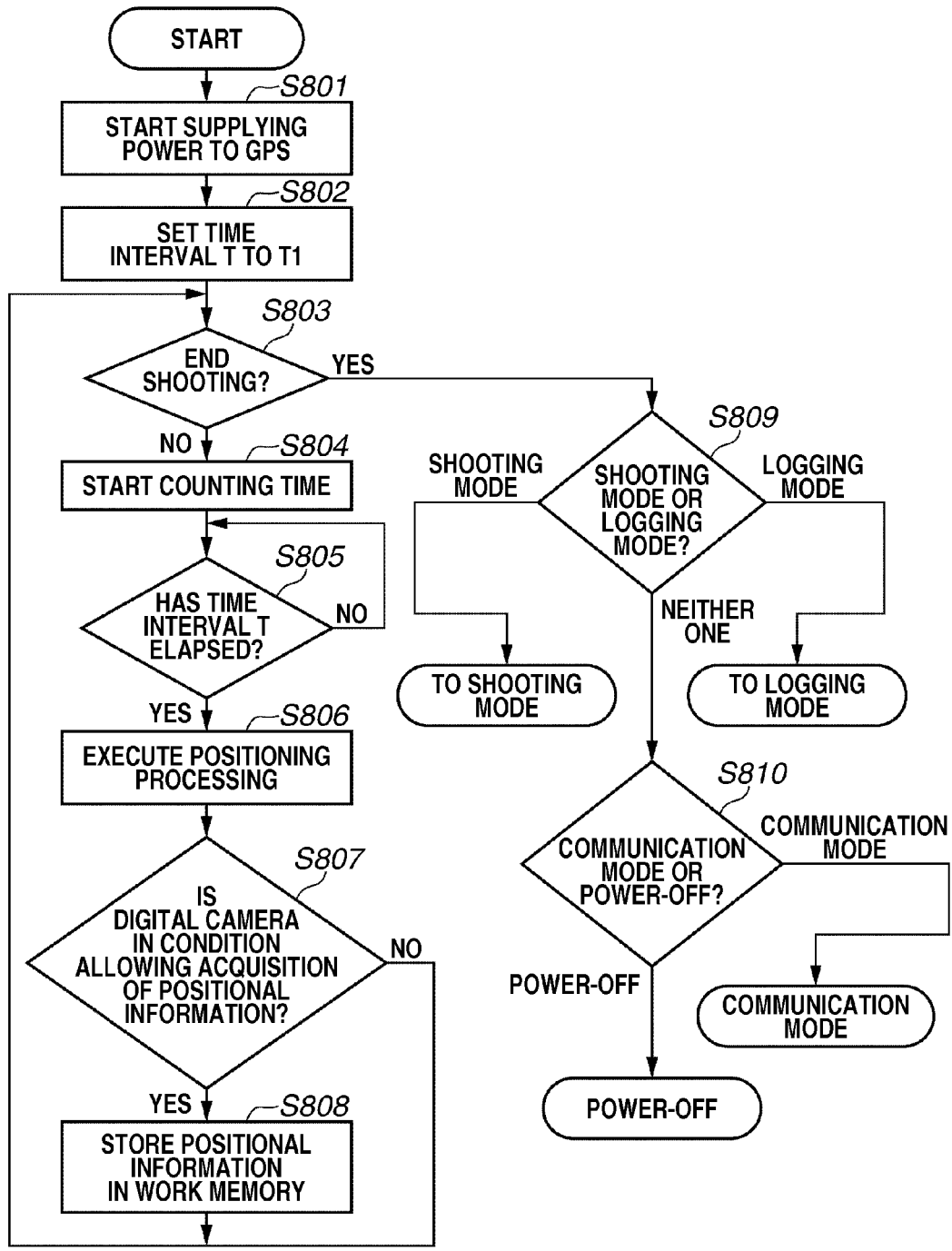
FIG. 8 is a flow chart illustrating an operation of the digital camera in a playback mode according to the first and the second exemplary embodiment.

FIG. 8 is a flow chart illustrating the positioning operation of the digital camera 100 in the playback mode. A description of the positioning operation in the playback mode is made with emphasis on portions different from the positioning operation in the shooting mode since operations are common to each other in many portions.

The processing illustrated in the flow chart is started in response to the transition of the operation mode of the digital camera 100 to the playback mode.

In step S803, the CPU 101 determines whether to end the playback mode. More specifically, the CPU 101 determines to end the playback mode in a case where the CPU 101 detects any one of the following cases. That is, the CPU 101 detects that the power button is pressed, that the operation unit 106 does not accept any operation for a certain period of time, that a remaining battery level becomes lower than a predetermined level, that the digital camera 100 is connected to the external device via the communication unit 109, or that the release switch is pressed. In cases other than the above, the CPU 101 determines not to end the playback mode. In a case where the CPU 101 determines to end the playback mode (YES in step S803), the processing proceeds to step S809.

In step S809, the CPU 101 determines a destination transition mode based on the detection result in step S803.

In step S809, in a case where the CPU 101 determines to shift to the logging mode, the CPU 101 stops supplying power to the GPS 108, the display unit 105, and the like. Accordingly, the digital camera 100 shifts to the logging mode.

In step S809, in a case where the CPU 101 determines to shift to the shooting mode, the CPU 101 stops supplying power to the display unit 105 and starts supplying power to the imaging unit 102 and the like. Accordingly, the digital camera 100 shifts to the shooting mode.

In step S809, in a case where the CPU 101 determines that the transition destination mode is neither one of the logging mode nor the shooting mode, the processing proceeds to step S810.

In step S810, the CPU 101 determines the transition destination mode based on the detection result in step S803.

In step S810, in a case where the CPU 101 determines to shift to the communication mode, the CPU 101 stops supplying power to the GPS 108, the display unit 105, and the like. Accordingly, the digital camera 100 shifts to the communication mode.

In step S810, in a case where the CPU 101 determines to shift to the power-off state, the CPU 101 stops supplying power to each unit of the digital camera 100. Accordingly, the digital camera 100 is placed in the power-off state.

Processing performed in steps S803, S809, and S810 maybe performed in a plurality of processing or may be performed at once.

Operations of processing in the other steps are similar to those performed in the shooting mode.

The operation of the digital camera 100 in the playback mode is described above.

An operation of the digital camera 100 in the logging mode is described below.

Figure 5:
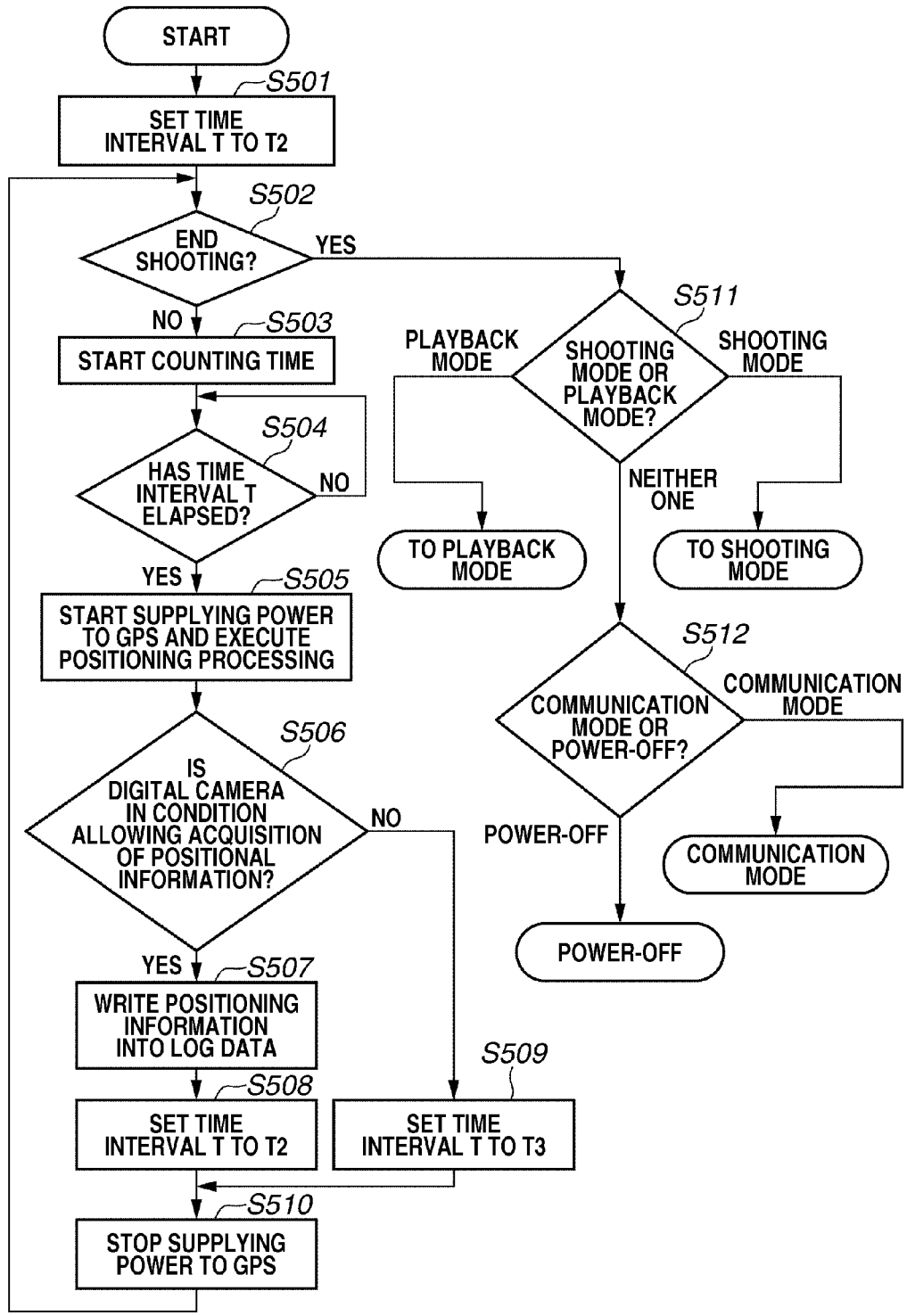
FIG. 5 is a flow chart illustrating an operation of the digital camera in a logging mode according to the first exemplary embodiment.

FIG. 5 is a flow chart illustrating the operation of the digital camera 100 in the logging mode. Processing illustrated in the flowchart is started when the digital camera 100 shifts to the logging mode.

In step S501, the CPU 101 sets the time interval T to T2. In the present exemplary embodiment, the time interval T2 is longer than the time interval T1 set as the time interval T in the shooting mode. More specifically, the positioning interval in the logging mode is set longer than the positioning interval in the shooting mode. The time interval set here is stored in the non-volatile memory 103.

In step S502, the CPU 101 determines whether to end the logging mode. More specifically, the CPU 101 determines to end the logging mode in a case where the CPU 101 detects any one of the following cases. That is, the CPU 101 detects that a battery is almost consumed, that the power button is pressed, that the playback button is pressed, and that the digital camera 100 is connected to the external device via the communication unit 109. In a case where the CPU 101 determines to end the logging mode, the processing proceeds to step S511. In cases other than the above, the CPU 101 determines not to end the logging mode.

In step S511, the CPU 101 determines a transition destination mode based on the detection result in step S502.

In step S511, in a case where the CPU 101 determines to shift to the playback mode, the CPU 101 starts supplying power to the display unit 105 and the like. Accordingly, the digital camera 100 shifts to the playback mode.

In step S511, in a case where the CPU 101 determines to shift to the shooting mode, the CPU 101 starts supplying power to the imaging unit 102 and the like. Accordingly, the digital camera 100 shifts to the shooting mode.

In step S511, in a case where the CPU 101 determines to shift to neither one of the shooting mode nor the playback mode, the processing proceeds to step S512.

In step S512, the CPU 101 determines the transition destination mode based on the detection result in step S502.

In step S512, in a case where the CPU 101 determines to shift to the communication mode, the digital camera 100 shifts to the communication mode.

In step S512, in a case where the CPU 101 determines to shift to the power-off state, the CPU 101 stops supplying power to each unit of the digital camera 100. Accordingly, the digital camera 100 is placed in the power-off state.

In step S502, on the other hand, in a case where the CPU 101 determines not to end the logging mode (NO in step S502), the processing proceeds to step S503.

In step S503, the CPU 101 starts counting time.

In the following step S504, the CPU 101 determines whether the time interval T has elapsed after the start of counting time. Since the time interval T is set to T2 in step S501, the CPU 101 determines whether the time interval T2 has elapsed after the start of counting time. In a case where the CPU 101 determines that the time interval T has not elapsed (NO in step S504), the CPU 101 waits until the time interval T has elapsed. In a case where the CPU 101 determines that the time interval T has elapsed (YES in step S504), the processing proceeds to step S505.

In step S505, the CUP 101 supplies power to the GPS 108 to perform the positioning. The processing is executed concurrently with processing in the following step S506.

In step S506, the CPU 101 determines whether the condition allows the acquisition of the positioning information in step S505. The processing in step S506 is similar to that performed in step S407 of FIG. 4. In a case where the CPU 101 determines that the condition does not allow the acquisition of the positional information (NO in step S506), the processing proceeds to step S509. In a case where the CPU 101 determines that the condition allows the acquisition of the positional information (YES in step S506), the processing proceeds to step S507.

In step S507, the CPU 101 adds the positional information acquired in step S505 to the log data. In a case where there is no log data to be added, log data generation processing is newly performed to record the positional information in the newly generated log data. Cases where there is no log data to be added are exemplified by a case where the positioning is performed at a first time in a new day and a case where the recording medium is exchanged to a brand-new one. Then, the processing proceeds to step S508.

In step S508, the CPU 101 sets the time interval T to T2. Then, the processing proceeds to step S510.

In step S506, on the other hand, in a case where the processing proceeds to step S509, in step S509, the CPU 101 sets the time interval T to T3. In the present exemplary embodiment, the time interval T3 is longer than the time interval T2. That is, in a case where the positional information cannot be acquired, the positioning interval is set to a larger value. Then, the processing proceeds to step S510.

In step S510, the CPU 101 stops supplying power to the GPS 108, and the processing then returns to step S502.

As described above, the digital camera 100 according to the present exemplary embodiment performs the positioning at the time interval T2 in the state where the positional information is acquirable, whereas the digital camera 100 performs the positioning at the time interval T3, which is longer than the time interval T2, in the state where the positional information is not acquirable. Such a configuration may also be employable that the time interval T is set to T3 in a case where the number of times that the positional information could not be acquired reaches the predetermined number.

The operation of the digital camera 100 in the logging mode is described above. As described above, in a case where the positional information cannot be acquired in step S505, then in step S508, the positioning interval is set to a larger value. Accordingly, in a case where the digital camera 100 is located at a place at which the positional information is difficult to acquire, the positioning interval is set to the larger value (i.e., the frequency for performing the positioning is lowered), so that the consumption of a battery can be reduced.

With the above-described configuration, in the shooting mode, the positioning interval is not changed but is kept constant even in a state where the positional information is not acquirable. Accordingly, the accuracy of the positional information to be added to the image data can be secured. On the other hand, in the logging mode, in a case where the positional information cannot be acquired, the positioning interval is set longer. Accordingly, the consumption of a battery can be reduced. As described above, the positioning accuracy and the power consumption can be controlled more suitably with good balance by differentiating the operation of the positioning between the shooting mode and the logging mode.

In the first exemplary embodiment, in a case where the positional information cannot be acquired in the logging mode, the positioning interval is set longer. In contrast, in a second exemplary embodiment of the present invention, in a case where the positioning is performed at the time interval T3, the number of times that the positional information cannot be acquired continuously is counted. In a case where the number of times that the positional information cannot be acquired continuously becomes more than a predetermined number, the CPU 101 ends the logging mode.

The second exemplary embodiment is described below focusing on portions unique to the second exemplary embodiment since many portions are common with the first exemplary embodiment.

The operation of the digital camera 100 in the logging mode according to the second exemplary embodiment is described below.

Figure 6:
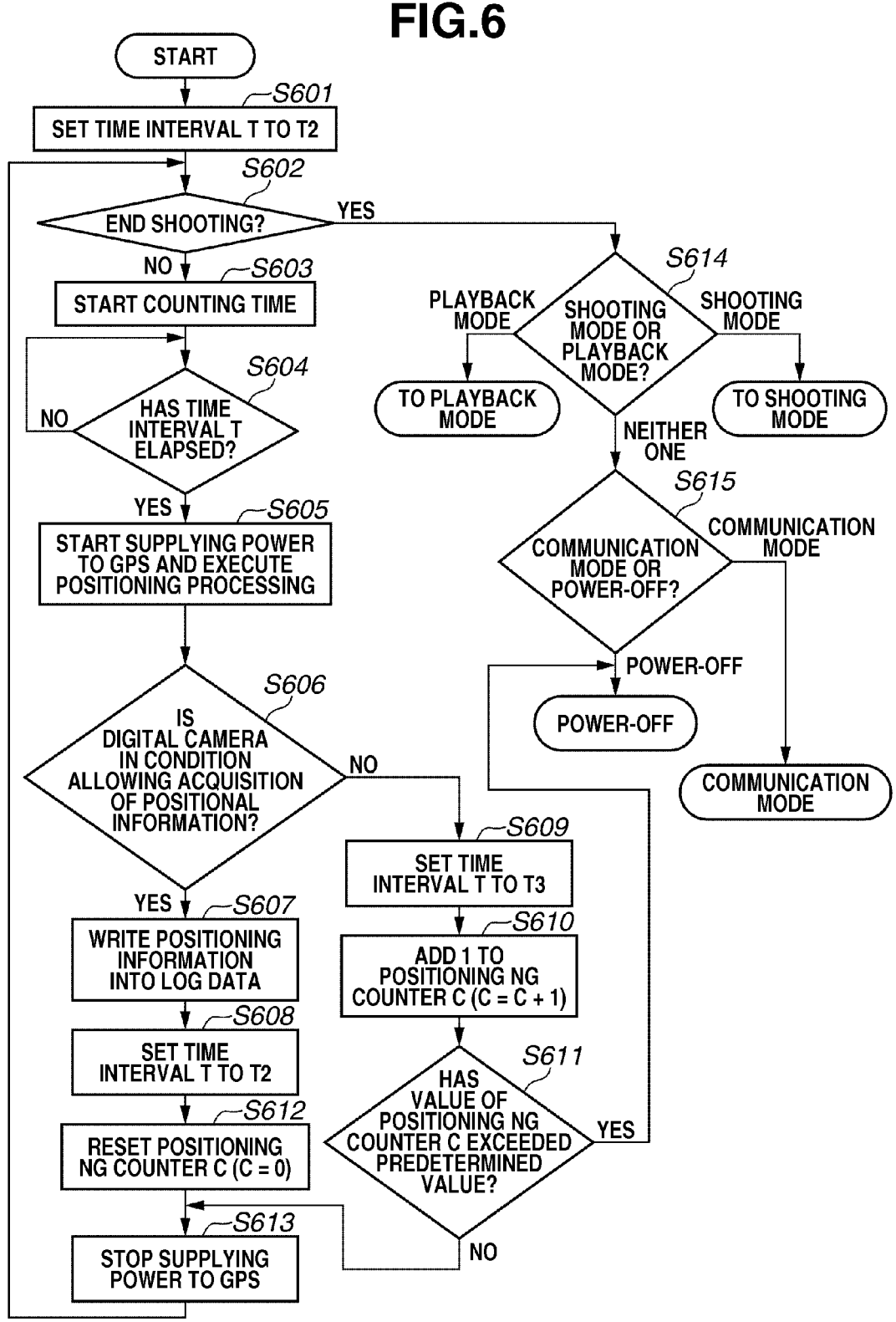
FIG. 6 is a flow chart illustrating an operation of the digital camera in the logging mode according to the second exemplary embodiment.

FIG. 6 is a flow chart illustrating an operation of the digital camera 100 in the logging mode according to the second exemplary embodiment. Processing illustrated in the flow chart is started in a case where the digital camera 100 shifts to the logging mode.

Processing from step S601 to step S605 are similar to those from step S501 to step S505, so that descriptions thereof are omitted here.

In step S606, similar to step S506 in FIG. 5, the CPU 101 determines whether the condition allows the acquisition of the positional information in step S605. The processing in step S606 is similar to that in step S407 of FIG. 4.

In step S606, a description is made as to a case that the CPU 101 determines that condition does not allow the acquisition of the positional information.

In step S606, in a case where the CPU 101 determines that the condition does not allow the acquisition of the positional information (NO in step S606), the processing proceeds to step S609.

In step S609, the CPU 101 sets the time interval T to T3. The processing is similar to that performed in step S509 of FIG. 5. Then, the processing proceeds to step S610.

In step S610, "1" is added to a value of a positioning NG counter. The value of the positioning NG counter is a parameter indicating the number of times that the positional information cannot be acquired continuously. The positioning NG counter is stored by the work memory 104 and has an initial value of "0".

In step S611, the CPU 101 refers to the value of the positioning NG counter and determines whether the value exceeds a predetermined value.

In step S611, in a case where the CPU 101 determines that the value of the positioning NG counter exceeds the predetermined value (YES in step S611), the CPU 101 stops supplying power to each unit of the digital camera 100. Accordingly, the digital camera 100 shifts to the power-off state.

In step S611, on the other hand, in a case where the CPU 101 determines that the value of the positioning NG counter does not exceed the predetermined value (NO in step S611), the processing proceeds to step S613.

In step S613, the CPU 101 stops, similar to step S510 of FIG. 5, supplying power to the GPS 108. Then, the processing returns to step S602.

The operation of the digital camera 100 of the present exemplary embodiment in a case where the CPU 101 determines that the condition does not allow the acquisition of the positioning information is described above.

In step S606, a case where the CPU 101 determines that the condition allows the acquisition of the positional information is described below.

In step S606, in a case where the CPU 101 determines that the condition allows the acquisition of the positional information (YES in step S606), the processing proceeds to step S607.

Processing in step S607 and step S608 is similar to that in step S507 and step S508 of FIG. 5, so that descriptions thereof are omitted here. After completing the processing in step S608, the processing proceeds to step S612.

In step S612, the CPU 101 resets the value of the above-described positioning NG counter to an initial value (i.e., to "0"). Then, the processing proceeds to step S613.

As described above, upon capturing an image, the digital camera 100 operates in the shooting mode. Generally, the user of the digital camera seldom keeps the camera in the shooting mode for a long time. In other words, the user often starts the shooting mode at a time when the user captures an image and switches to the mode other than the shooting mode after capturing the image. In the digital camera, a time period that the digital camera is in the shooting mode is extremely shorter than a time period that the digital camera is in the logging mode. Therefore, even if the CPU 101 continues performing the positioning in the shooting mode, the time for doing so is short, so that the power consumption is considered not to increase remarkably. Therefore, the CPU 101 does not stop performing the positioning but keeps on performing the positioning during the shooting mode.

On the other hand, when the moving locus is recorded, the digital camera 100 operates in the logging mode. As described above, generally, a time period that the digital camera is in the logging mode is considered to be extremely longer than a time period that the digital camera is in the shooting mode. Therefore, even in a state where the positioning information cannot be acquired, the positioning might be repeated until the battery is completely consumed. In the above case, with the configuration according to the present exemplary embodiment, the CPU 101 also can automatically end the logging mode in a case where the positional information cannot be acquired, thereby reducing waste of battery consumption.

Figure 2:
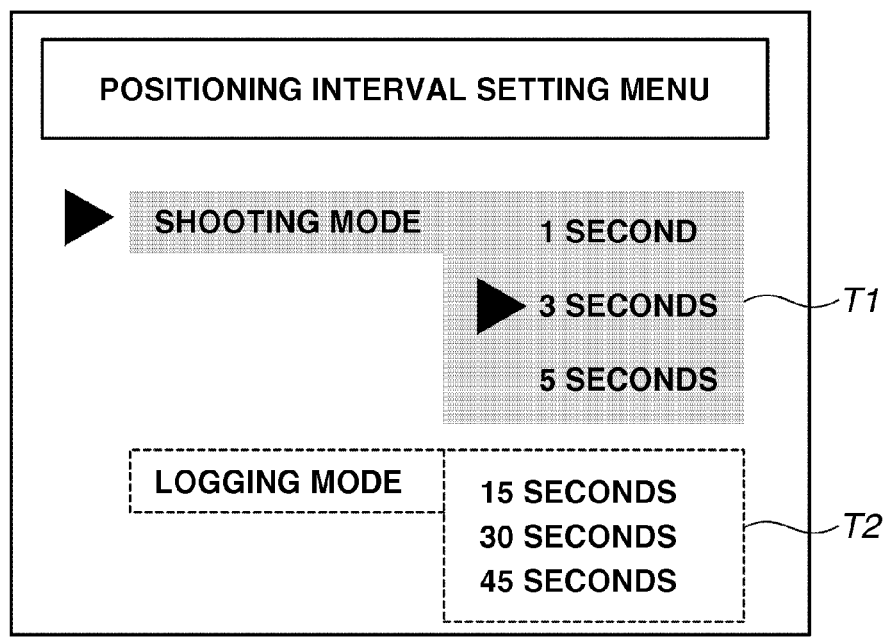
FIG. 2 illustrates an example of a setting screen for setting a positioning interval according to another exemplary embodiment of the present invention.

In the above-described exemplary embodiment, a description is made provided that the value of the time interval T1 and the value of the time interval T2 are given in advance. The value of the time interval may be set in advance by the user. For example, as illustrated in FIG. 2, the value of the time interval T1 and the value of the time interval T2 can be set by accepting the user's operation via the operation unit 106 via a menu displayed on the display unit 105. In the case of a configuration that the user can set each of the time intervals, the time interval may be controlled such that the time interval T1 can be set only to a value shorter than T2. Alternatively, the time interval may be controlled such that the time interval T2 can be set only to a value longer than the value of the time interval T1.

In the above-described exemplary embodiment, the example in which the positioning performed in the playback mode is similar to the processing performed in the shooting mode is described. The positioning performed in the playback mode may be configured so as to perform the same processing as the operation performed in the logging mode. With such a configuration, the user can keep the positional information as the log data while viewing an image during a movement in, for example, a car or a train.

In the logging mode according to the above-described exemplary embodiment, the description is made such that the digital camera operates in a state that the power consumption is suppressed. The digital camera 100 may be configured so as to include a counting time unit having a CPU different from the CPU 101 and the counting time unit counts time to determine whether the time interval T has elapsed. In this case, the counting time unit counts time while the power supply to each unit of the digital camera 100 including the CPU 101, that is different from the one included in the counting time unit, is stopped. More specifically, after the positioning performed by the GPS 108, the CPU 101 stops the power supply to each unit of the digital camera 100 except for the counting time unit. Then, the counting time unit starts counting time and activates the CPU 101 and the GPS 108 according to the elapsed time set as the time interval. After the activation thereof, the counting time unit performs the positioning and, subsequently, stops supplying power to the CPU 101 and the GPS 108 again. By repeating the above-described processing, in the logging mode, the CPU 101 operates only when it performs the positioning, whereas, only the counting time unit operates during the other lot of time. As a result thereof, the power consumption can be more suppressed.

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2011-022859 filed Feb. 4, 2011, which is hereby incorporated by reference herein in its entirety.

What is claimed is:

1. An imaging apparatus comprising:
an imaging unit configured to capture an image of an object to acquire image data thereof;
a positioning unit configured to perform positioning processing for acquiring positional information indicating a position of the imaging apparatus;
an association unit configured to associate the positional information acquired by the positioning unit with the image data acquired by the imaging unit;
a log data generation unit configured to generate log data based on the positional information acquired by the positioning unit;
a first control unit configured to control the positioning unit to perform the positioning processing at a first time interval, and to control the association unit to associate the positional information acquired by the positioning processing performed at the first time interval with the image data; and
a second control unit configured to control the positioning unit to perform the positioning processing at a second time interval, and to control the log data generation unit to generate the log data based on the positional information acquired by the positioning processing performed at the second time interval,
wherein the first control unit controls the positioning unit to perform the positioning processing at the first time interval irrespective of an acquisition status of the positional information,
wherein, when it is determined that the acquisition status of the positional information does not satisfy a predetermined condition, the second control unit changes a time interval at which the positioning processing is performed to a third time interval that is longer than the second time interval, and wherein, when it is determined that the acquisition status of the positional information satisfies the predetermined condition, the second control unit sets the time interval at which the positioning processing is performed to the second time interval.

2. The imaging apparatus according to claim 1, wherein the first time interval and the second time interval are settable based on an operation of a user.

3. The imaging apparatus according to claim 1, further comprising a storing unit configured to store a value indicating a number of times it is determined that the acquisition status of the positional information does not satisfy the predetermined condition,
wherein, when the value stored by the storing unit exceeds a predetermined value, the second control unit controls the positioning unit to stop the positioning processing.

4. The imaging apparatus according to claim 3, wherein, when it is determined that the acquisition status of the positioning information in the positioning processing satisfies the predetermined condition, the second control unit changes the value stored by the storing unit to an initial value.

5. The imaging apparatus according to claim 1, wherein the first time interval is shorter than the second time interval.

6. A method for controlling an imaging apparatus, the method comprising:
performing image capturing processing, in an imaging apparatus, for acquiring image data by capturing an image of an object;
performing positioning processing, in a first positioning process, in which positional information indicating a position of the imaging apparatus is acquired at a first time interval;
associating, in an association process, the positional information acquired in the first positioning process with the image data acquired in the imaging process;
performing, in a second positioning process, the positioning processing in which the positional information indicating a position of the imaging apparatus is acquired at a second time interval; and
generating log data, in a log data generating process, based on the positional information acquired in the second positioning process,
wherein, in the first positioning process, the positioning processing is performed at the first time interval irrespective of an acquisition status of the positional information,
wherein, in the second positioning process, when it is determined that the acquisition status of the positional information does not satisfy a predetermined condition, a time interval at which the positioning processing is performed is changed to a third time interval that is longer than the second time interval, and
wherein, when it is determined that the acquisition status of the positional information satisfies the predetermined condition, the time interval at which the positioning processing is performed is set to the second time interval.

7. A non-transitory computer-readable storage medium storing a computer-readable program for causing a computer to perform the method according to claim 6.

\* \* \* \* \*